Feb. 2, 1965 SHIRO OKAMURA 3,168,705

SIGNAL DELAYING APPARATUS

Filed Aug. 1, 1962

INVENTOR
SHIRO OKAMURA
BY Haseltine Lake & Co.
ATTORNEYS

United States Patent Office 3,168,705

Patented Feb. 2, 1965

3,168,705

SIGNAL DELAYING APPARATUS

Shiro Okamura, 2–26 Shiroganedaimachi, Shiba, Minatoku, Tokyo, Japan

Filed Aug. 1, 1962, Ser. No. 214,089
11 Claims. (Cl. 330—10)

This invention relates to signal delaying apparatus, and particularly to delay means capable of very rapid response to vary the amount of the delay.

At the present time, various methods are known for delaying an electrical signal. One of these methods utilizes an equivalent transmission line comprising lumped constants such as capacitance and inductance, in which delay is produced by varying the value of either or both the inductance and capacitance.

Recently, in scientific research and in industry there have arisen requirements for very rapid variation of the delay. For example, in video tape recorder systems, the mechanical rotation of the rotatable head assembly is subject to irregularities, such as jitter, which must be substantially suppressed to achieve good reproduction of the television picture. The apparatus heretofore used for suppressing or compensating the jitter employed variable delay means which utilized a suitable feedback control system. To effectively suppress the jitter, however, the delay must be variable within the order of a microsecond.

The conventional delay apparatus, which includes lumped constants, lacks high speed response. The speed of response is unsatisfactory even if a saturable magnetic core having variable permeability, or a capacitor having a pn junction is employed, as the transient response is relatively slow.

The conflicting requirements of delay and quick response can be reconciled by a delay line having a plurality of taps which are switched electronically. Such system, however, suffers from complexity of construction, since a large number of taps are ordinarily required.

Accordingly, it is an object of this invention to provide delay means which has very quick response and which is also simple in construction and small in size.

Figures 1, 2:
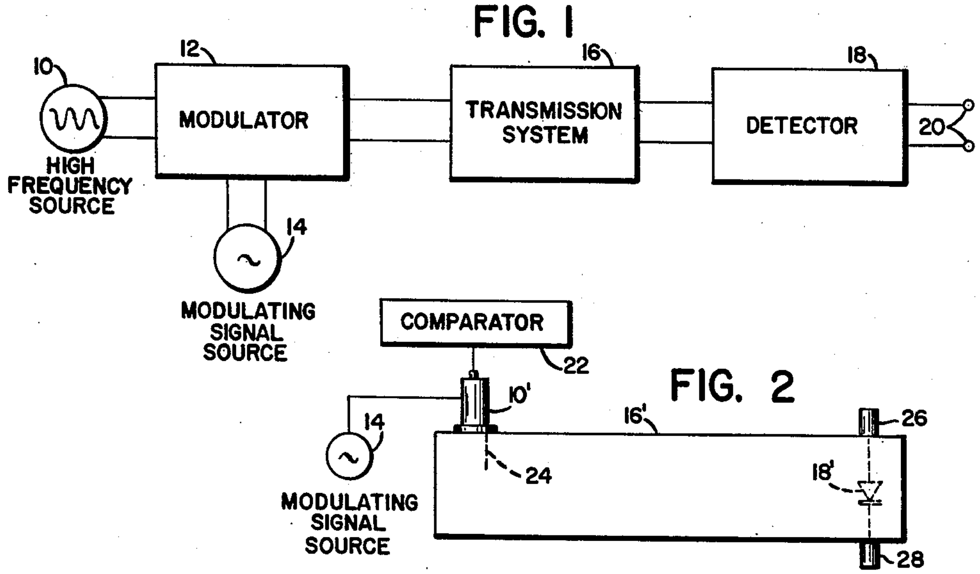
Figure 3:
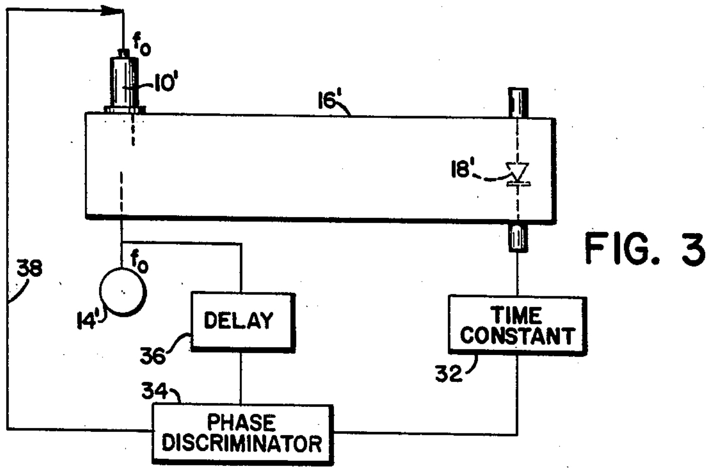
Figure 4:
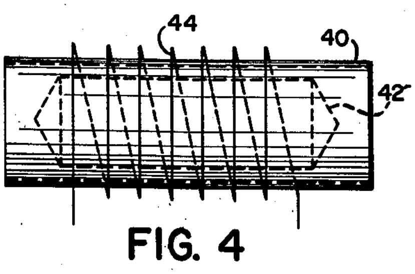
Figure 5:
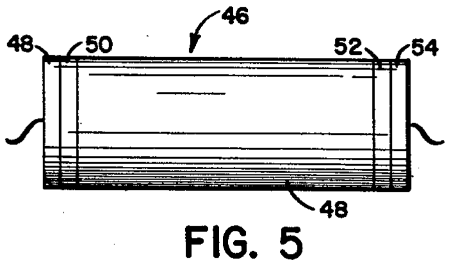

The above mentioned and other features and objects of this invention and the manner of attaining them will become more apparent and the invention itself will be best understood by reference to the following description of an embodiment of the invention taken in conjunction with the accompanying drawing, in which:

FIGURE 1 is a block diagram of a single delaying system according to the invention, FIGURE 2 illustrates an embodiment of the invention which includes a rectangular waveguide as a wave transmitting means, FIGURE 3 is a diagram, partly in block form, showing an automatic control system used with the apparatus of FIGURES 1 and 2, FIGURE 4 illustrates a circular waveguide suitable for use with the invention, FIGURE 5 is a supersonic transmission medium which can be employed with the invention.

According to the invention, there is provided a signal delay system, comprising means for modulating a wave with a signal to be delayed, means coupled to said modulating means for delaying and transmitting said modulated wave, and means for demodulating said modulated wave.

In accordance with a further aspect of the invention, a feedback circuit is employed to compensate for spurious variation between the cut-off frequency of the transmitting means and the wave frequency.

Referring now to FIGURE 1, there is shown, in block form, a diagram of the novel signal delaying system. A high frequency source 10, preferably an oscillator of the variable frequency type, is provided for producing an electrical output wave which is modulated by a suitable frequency or pulse modulator 12 in accordance with a signal from a modulating source 14. The output of the modulator 12 is fed to a transmission system 16 which may comprise for example, a wave guide, having a cut-off frequency close to the frequency of the oscillator 10. The output of the transmission system 16 is fed to a detector or demodulator 18 which reproduces a signal at the terminals 20 that is a delayed replica of the signal from the modulating signal source 14. If the frequency of the oscillator 10 varies a moderate amount, the delay of the modulated signal varies a considerable amount because the frequency of the oscillator is close to the cut-off frequency of the wave guide.

FIGURE 2 shows apparatus for carrying out the functions of the blocks shown in FIGURE 1. The oscillator 10 is shown as a reflux klystron type oscillator 10'. The oscillator carrier frequency can be varied in accordance with an error signal derived from a comparator 22 which may comprise, for example, a video tape recording of the signal to be reproduced and a suitable reference signal such as from a flywheel circuit. The modulation of the wave from the reflex klystron oscillator 10' may be carried out, for example, by pulse width modulation. Alternatively, frequency modulation could be achieved by means of varying the repeller voltage or by the use of suitable reactance tube or diode circuits.

The modulated wave from the reflex klystron 10' in FIGURE 2 excites a rectangular wave guide 16' by means of an output probe 24. The modulated wave, after propagation is fed to a crystal detector or demodulator 18' which is matched by matching elements 26 and 28 in known manner. The detected output signal from the detector 18' is a delayed replica of the output from the signal source 14.

The propagation velocity of the wave in the wave guide 16' may be computed from the formula $$v_g = c\sqrt{1-(\lambda/\lambda_c)^2} \qquad (1)$$

where $v_g$ is the group velocity, $c$ is the velocity of the electromagnetic wave in free space, $\lambda$ is the wavelength of the oscillation from the oscillator 10' and $\lambda_c$ is the cut-off wavelength of the wave guide 16'. For the wave guide arrangement shown in FIGURE 2, the time of delay is given by the formula $$t_d = \frac{L}{c\sqrt{1-(\lambda/\lambda_c)^2}} \qquad (2)$$

From this equation, it is apparent that for the variation of wavelength from $\lambda$ to $\lambda_c$, the time delay $t_d$ varies from a certain value to an infinite value. Accordingly, a very large amount of delay which is variable very quickly can thus be achieved. The variation of wavelength can be performed very quickly by, for example, varying the repeller voltage on the klystron tube 10' or by other suitable means. The nearer the wavelength $\lambda$ of the oscillator 10' to the cut-off wavelength $\lambda_c$ of the wave guide 16', the smaller is the variation necessary for a given change in delay. However, the frequency or wavelength from the oscillator 10' cannot be made too close to $\lambda_c$ because the effects of temperature variation become serious. Moreover, the spreading of the frequency band due to modulation of the signal from the source 14 should be considered. It is advisable to use a reasonable length for the guide, keeping in mind the maximum delay desired and the modulation frequency. A response of the order of millimicroseconds is feasible when variation of the repeller voltage is employed.

Drifting of the oscillation frequency or cut-off frequency due to temperature changes or other causes can be compensated for by the use of an automatic feedback control loop such as that shown in FIGURE 3. In this arrangement the klystron oscillator 10' is modulated by an oscillator 14' having a frequency $f_0$. The frequency $f_0$ is preferably a value such that the sidebands produced lie outside of the frequency band occupied by the modulated wave of the signal to be delayed, such as the video signal. If this condition is not met, it is advisable that the $f_0$ signal be frequency modulated and the signal to be delayed be amplitude modulated. The two frequencies may then lie in the same band. The oscillation of the frequency $f_0$ signal may be made near the cut-off frequency of the wave guide 16' and introduced into the guide independent of the modulated wave, if drifting of both oscillation frequencies is negligible, or the $f_0$ signal may modulate another carrier frequency and this modulated wave may be coupled to the guide. In any case, the signal $f_0$ is detected by the detector 18' after transmission through the guide 16'.

The detected signal $f_0$ is fed from the output of the guide 16' through a time constant circuit 32 to a suitable comparator, such as a phase discriminator 34 or a frequency discriminator. The signal $f_0$ is also fed to the discriminator 34 from the oscillator 14' via a delay circuit 36 having a fixed delay time $t_0$. The time constant of the circuit 32 is chosen so that the feedback control loop has a quick enough response to compensate for drifting of the cut-off wavelength $\lambda_c$ due to temperature variations. The rate of the drifting is usually very small compared with that of the lowest required value of delay variation. The fixed delay circuit 36 is of a known type and its time delay $t_0$ is chosen to coincide with the delay time of the wave guide 16' at a given standard condition. The discriminator 34 then produces an error output signal on the wire 38 if any deviation of the delay occurs in the guide 16'. This output signal controls the frequency of the klystron oscillator 10', which may be accomplished by varying the repeller voltage on the klystron. Mechanical tuning means, such as for example, a torque motor, can also be satisfactorily employed to control the oscillator frequency since the drifting is generally rather slow. Instead of employing the frequency $f_0$ above described, the central oscillation frequency may be filtered out of the delayed output and utilized.

In accordance with the above description, the apparatus is controlled automatically to develop a constant delay at a standard condition by the feedback control system. The quick variation of the delay is performed as described above without being disturbed by the feedback control loop. The slow adjustment of the delay can be achieved by variation of the fixed delay 36 in known manner. The error signal obtained from the discriminator 34 in the manner just described may be fed to means for varying the cut-off frequency of the guide, which means may, for example, vary the dimensions or shape of the guide, or may be employed to control insertion of a suitable plate into the guide, thus effecting compensation for the variation of the cut-off frequency.

Variation of the frequency of oscillation of the oscillator 10 could also be achieved by the use of a cavity coupled oscillator valve, by varying the resonant frequency of the cavity with the aid of a gas discharge. The drifting of the frequency of the oscillator itself can be stabilized in accordance with prior art techniques, however, this is not necessary so long as the compensating means, such as described above is employed. Further, a backward wave oscillator could also be employed, as the frequency of such an oscillator is easily controlled by varying the voltage. A variable cavity provided with a saturable ferrite coupled to an oscillator tube can also be used. Still other types of oscillators could also be employed.

The technique for varying the delay of the transmission system can be modified so that the cut-off frequency is varied instead of varying the frequency of the transmitted wave as described above. In other words, the ratio $\lambda/\lambda_c$ may be changed either by varying $\lambda$ or $\lambda_c$. The variation of $\lambda_c$ may be achieved, for example, with the aid of a ferrite block inserted into the guide 16', the ferrite being provided with magnetization control means. A gas discharge device within the guide could also be employed. With the feedback control system described above, the error signal output could also be applied to the means which varies the guide cut-off wavelength $\lambda_c$. For this purpose guide walls which are movable and controlled in response to the error input signal can be employed. If the ferrite block is used instead, the means for varying the saturation of the ferrite should have a small inductance in order to provide quick response.

Referring now to FIGURE 4, the numeral 40 indicates a circular wave guide wihch may be employed in place of the rectangular wave guide 16' of FIGURES 2 and 3; arrangements for coupling an input and output from the circular guide 40 are well known in the art and therefore not shown. The numeral 42 indicates a ferrite cylinder inserted within the guide 40 which is suitably shaped at each end to provide good matching, a coil 44 being provided for magnetizing the ferrite. The response of this arrangement is quicker than the prior art which employes the artificial delay line with a saturable core operating at a lower frequency and which has a larger inductance and a slower response.

In addition to the rectangular and circular wave guides described above, guides of other shapes such as for example, elliptical, can also be employed for the transmission system 16. Whatever the particular form of these guides, however, the time delay varies according to the Formula 2 above. A wave guide filled with a dielectric medium, a zig-zag type wave guide, or an interdigital slow wave structure are preferable due to their short length. Also a coaxial transmission system having one or more wave modes or an open wire system having a wave mode between the wires can be used. The transmission system which can be utilized in the invention is not restricted to any of the systems referred to herein but various other systems can also be employed.

FIGURE 5 shows a supersonic transmission system having a predetermined cut-off frequency; the transmitting medium being an electromechanical transducer 46 of barium trititanate. Other materials such as nickel, quartz or mercury may also be used. The diameter of the medium may be relatively large to permit the lateral wave mode to be produced so that the cut-off frequency exists. The numeral 48 indicates portions of the barium trititanate and the numeral 50 indicates a suitable junction material known in the prior art. The input to the electromechanical transducer 46 is the modulated signal from the modulator 12, see FIGURE 1. The numeral 52 indicates a known junction material at the output of the electromechanical transducer. The detection of the output signal from the output 54 of the transducer yields the desired delayed signal. With the aid of such a small supersonic device, a large delay which is very quickly variable by varying the carrier frequency can be achieved.

The modulation of the carrier by the signal may be performed in any suitable manner. For a modulated wave having a narrow frequency band, single or residual side band amplitude or frequency modulation may be preferable. Modulation of various types such as pulse position modulation, pulse width modulation, pulse frequency modulation, and pulse code modulation may be used.

The device of this invention is smaller than prior art devices and has a more rapid response. It is useful, as noted above in tape recorder systems, computers and in other applications. In the case of computers, the signal is digital, giving on or off information, so that the required band is relatively small, which is compatible with making the frequency comparatively close to the cut-off frequency. The principles of this invention are also applicable to systems utilizing frequencies in the region of light. In such systems, the light wave giude can be made of very thin glass tubes or metallic slots made by a micro-etch or electron beam technique. The modulation and demodulation of the light can be performed by known techniques.

As already noted the delay apparatus according to the invention is quite compact and eliminates the need in the field for fixed delay devices and relay distortion compensators used in frequency modulation equipment. Further, the quick response to the variation of delay is very useful as indicated above for video tape recorders for compensation of jitter and also for compensation of the timing error of the multiple heads due to slight errors in head displacement.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A signal delaying apparatus comprising means for modulating a first wave with said signal, high frequency transmitting means for receiving said modulated wave and including delay means for delaying the passage of said wave therethrough, said transmitting means comprising a hollow waveguide, means for demodulating said modulated wave after transmission through said waveguide, characterized in that said waveguide has at least one cutoff frequency, said cut-off frequency being near to the frequency of said modulated wave, the travel of the wave through said waveguide being delayed in accordance with the formula $$\frac{1}{\sqrt{1-(\lambda/\lambda_c)^2}}$$

where $\lambda$ is the wavelength of said first wave and $\lambda_c$ is the wavelength of said cutoff frequency.

2. A signal delaying apparatus according to claim 1 in which the frequency of said wave is varied to effect the variation of the delay produced.

3. A signal delaying apparatus according to claim 1 in which said cut-off frequency is varied to effect the variation of the delay produced.

4. A signal delaying apparatus comprising means for modulating a first wave with said signal, high frequency transmitting means for receiving the modulated wave and including delay means for delaying the passage of said wave therethrough, the frequency of said first wave being variable to effect a variation in the amount of delay produced, means for demodulating said modulated wave after transmission through said transmitting means, characterized in that said transmitting means has at least one cut-off frequency, the cut-off frequency being near to the frequency of said modulated wave, and means for compensating for spurious variations produced by said transmitting means.

5. A signal delaying apparatus comprising means for modulating a first wave with said signal, high frequency transmitting means for receiving the modulated wave and including delay means for delaying the passage of said wave therethrough, the frequency of said first wave being variable to effect a variation in the amount of delay produced, means for demodulating said modulated wave after transmission through said transmitting means, characterized in that said transmitting means has at least one cut-off frequency, the cut-off frequency being near to the frequency of said modulated wave, and means for compensating for spurious variations produced by said transmitting means, whereby a signal having a constant frequency is transmitted through said transmission means, said compensating means including means for comparing the delay of said constant frequency signal with the delay of the signal derived from the signal generator of said constant frequency signal through a constant delay means, said compensating means further including means for producing an output from said comparing means, said compensating means also including means for feeding said output to means for varying the cut-off frequency of said transmitting means to compensate for spurious variations of said cut-off frequency and the frequency of said first wave.

6. A signal delaying apparatus comprising means for modulating a first wave with said signal, high frequency transmitting means for receiving the modulated wave and including delay means for delaying the passage of said wave therethrough, the frequency of said first wave being variable to effect a variation in the amount of delay produced, means for demodulating said modulated wave after transmission through said transmitting means, characterized in that said transmitting means has at least one cut-off frequency, the cut-off frequency being near to the frequency of said modulated wave, and means for compensating for spurious variations produced by said transmitting means, whereby a signal having a constant frequency is transmitted through said transmission means, said compensating means including means for comparing the delay of said constant frequency signal with the delay of the signal derived from the signal generator of said constant frequency signal through a constant delay means, said compensating means further including means for producing an output from said comparing means, said compensating means also including means for feeding said output to means for varying the frequency of said first wave to compensate for variations in the delay produced by relative spurious variations between the said cut-off frequency and the frequency of said first wave.

7. A signal delaying apparatus comprising means for modulating a first wave with said signal, high frequency transmitting means for receiving the modulated wave and including delay means for delaying the passage of said wave therethrough, the frequency of said first wave being variable to effect a variation in the amount of delay produced, means for demodulating said modulated wave after transmission through said transmitting means, characterized in that said transmitting means has at least one cut-off frequency, the cut-off frequency being near to the frequency of said modulated wave, and means for compensating for spurious variations produced by said transmitting means, whereby a signal having a constant frequency is transmitted through said transmission means, said compensating means including means for comparing the delay of said constant frequency signal with the delay of the signal derived from the signal generator of said constant frequency signal through a constant delay means, said comparing means comprising a phase detector which detects a difference between said constant frequency signal through said delay means and said constant frequency signal through said constant delay means, said compensating means further including means for producing an output from said comparing means, said compensating means also including means for feeding said output to means for varying the cut-off frequency of said transmitting means to compensate for spurious variations of said cut-off frequency and the frequency of said first wave.

8. A signal delaying apparatus comprising means for modulating a first wave with said signal, high frequency transmitting means in the form of an electromagnetic waveguide for receiving the modulated wave and including delay means for delaying the passage of said wave therethrough, the frequency of said first wave being variable to effect a variation in the amount of delay produced, means for demodulating said modulated wave after transmission through said transmitting means, characterized in that said transmitting means has at least one cut-off frequency, the cut-off frequency being near to the frequency of said modulated wave, and means for compensating spurious variations produced by said transmitting means, whereby a signal having a constant frequency is transmitted through said transmission means, said compensating means including means for comparing the delay of said constant frequency signal with the delay of the signal derived from the signal generator of said constant frequency signal through a constant delay means, said compensating means further including means for producing an output from said comparing means, said compensating means also including means for feeding said output to means for varying the cut-off frequency of said transmitting means to compensate for spurious variations of said cut-off frequency and the frequency of said first wave.

9. A signal delaying apparatus comprising means for modulating a first wave with said signal, high frequency transmitting means in the form of an electromechanical transducer for receiving the modulated wave and including delay means for delaying the passage of said wave therethrough, the frequency of said first wave being variable to effect a variation in the amount of delay produced, means for demodulating said modulated wave after transmission through said transmitting means, characterized in that said transmitting means has at least one cut-off frequency, the cut-off frequency being near to the frequency of said modulated wave, and means for compensating for spurious variations produced by said transmitting means, whereby a signal having a constant frequency is transmitted through said transmission means, said compensating means including means for comparing the delay of said constant frequency signal with the delay of the signal derived from the signal generator of said constant frequency signal through a constant delay means, said compensating means further including means for producing an output from said comparing means, said compensating means also including means for feeding said output to means for varying the cut-off frequency of said transmitting means to compensate for spurious variations of said cut-off frequency and the frequency of said first wave.

10. A signal delaying apparatus comprising means for modulating a first wave with said signal, high frequency transmitting means in the form of a coaxial transmission system for receiving the modulated wave and including delay means for delaying the passage of said wave therethrough, the frequency of said first wave being variable to effect a variation in the amount of delay produced, means for demodulating said modulated wave after transmission through said transmitting means, characterized in that said transmitting means has at least one cut-off frequency, the cut-off frequency being near to the frequency of said modulated wave, and means for compensating for spurious variations produced by said transmitting means, whereby a signal having a constant frequency is transmitted through said transmission means, said compensating means including means for comparing the delay of said constant frequency signal with the delay of the signal derived from the signal generator of said constant frequency signal through a constant delay means, said compensating means further including means for producing an output from said comparing means, said compensating means also including means for feeding said output to means for varying the cut-off frequency of said transmitting means to compensate for spurious variations of said cut-off frequency and the frequency of said first wave.

11. A signal delaying apparatus comprising means for modulating a first wave with said signal, high frequency transmitting means for receiving the modulated wave and including delay means for delaying the passage of said wave therethrough, the frequency of said first wave being variable to effect a variation in the amount of delay produced, means for demodulating said modulated wave after transmission through said transmitting means, characterized in that said transmitting means has at least one cut-off frequency, the cut-off frequency being near to the frequency of said modulated wave, and means for varying the cut-off frequency comprising a waveguide containing a magnetic material.

References Cited by the Examiner

UNITED STATES PATENTS

| | | | |
|---|---|---|---|
| 2,255,642 | 9/41 | Artzt | 330—10 |
| 2,707,233 | 4/55 | Norton | 331—9 |
| 3,090,925 | 5/63 | Adler et al. | 330—43 |

ROY LAKE, *Primary Examiner.*